United States Patent

[11] 3,631,903

[72] Inventor Clyde J. Huggins
Route 2, Box 224, Mayward Road, Cary, N.C. 27511
[21] Appl. No. 8,885
[22] Filed Feb. 5, 1970
[45] Patented Jan. 4, 1972

[54] METERING TRAP CONSTRUCTION, APPARATUS AND METHOD FOR FILLING INDIVIDUAL CONTAINERS WITH FLUID MATERIALS
17 Claims, 13 Drawing Figs.

[52] U.S. Cl. .................................................. 141/1, 141/144, 141/238, 222/170
[51] Int. Cl. ....................................................... B65b 1/04, B65b 3/04
[50] Field of Search .......................................... 141/1, 34, 129, 144, 160, 186, 220, 234, 238–246; 222/138, 168.5, 170, 361, 362, 365, 367

[56] References Cited
UNITED STATES PATENTS
3,259,152  7/1966  Schimkat........................ 141/144

Primary Examiner—Houston S. Bell, Jr.
Attorney—B. B. Olive

ABSTRACT: A high-productivity packaging apparatus and method utilize a container and a plurality of circular arranged metering units or "traps" which communicate and rotate with the container. The individual traps have fixed internal guide surfaces but no moving parts. During rotation around the container axis each trap successively draws from the container in excess of a unit of material to be packaged, then traps a unit and discharges the excess and during continued rotation the material is directed along the guide surfaces towards a trap outlet to be discharged at a discharge station to which empty containers are fed successively in synchronism with successive traps being discharged.

INVENTOR.
Clyde J. Huggins

BY

ATTORNEY

INVENTOR.
Clyde J. Huggins

BY

*B. B. Olive*

ATTORNEY

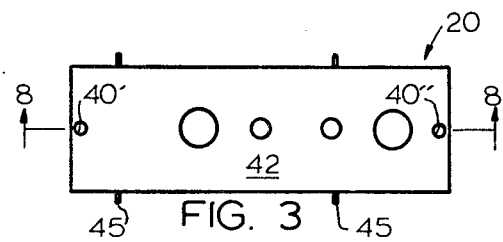
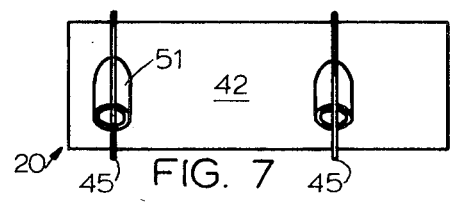
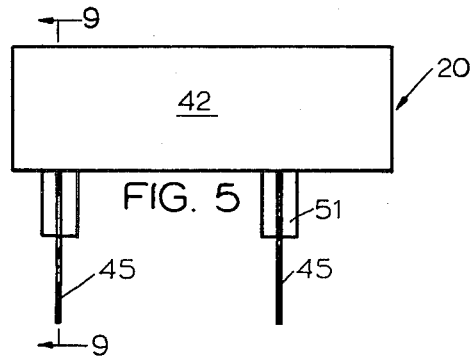
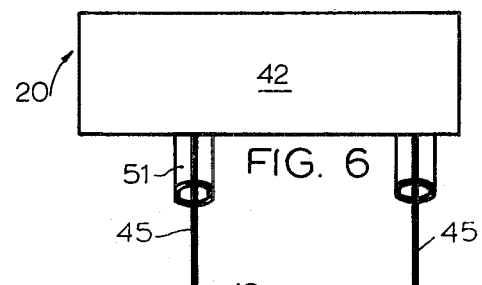
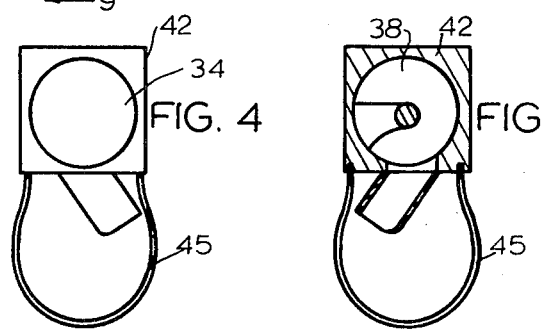
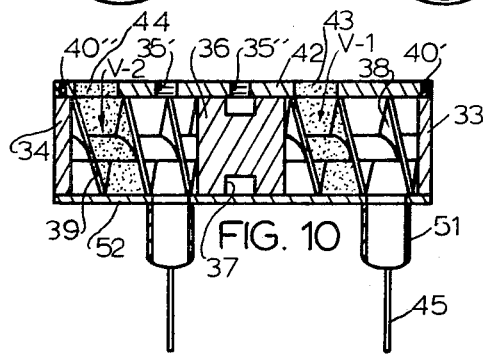
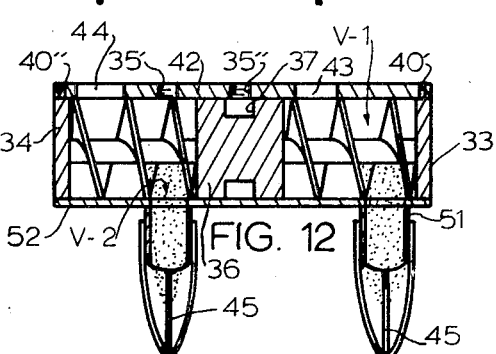
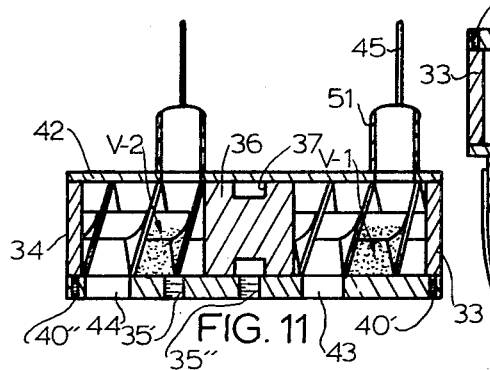
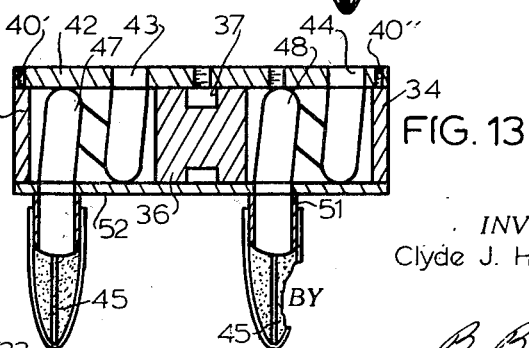
INVENTOR.
Clyde J. Huggins
BY
B. B. Olive
ATTORNEY

METERING TRAP CONSTRUCTION, APPARATUS AND METHOD FOR FILLING INDIVIDUAL CONTAINERS WITH FLUID MATERIALS

CROSS-REFERENCE TO RELATED APPLICATION

This application relates to application Ser. No. 805,149 "Packaging Apparatus And Method For Filling Individual Containers" filed Mar. 7, 1969 by Ernest L. Matthews and Ralph E. Matthews.

BACKGROUND OF THE INVENTION

1. Field of the Invention

This invention pertains to fluid material measuring and dispensing, to improvements in the packaging art, and more particularly to a condiment-type material packaging valve or metering unit, apparatus and method for packaging individual serving-type packages of, for example, sugar, salt, pepper, mustard, catsup and the like. The packet to be filled may be of the preformed, printed type or may be formed from a continuous, preprinted roll of plastic and or paper of the heat sealable type by commercially available apparatus or the packet may be a bottle or box and in either case the packet-feeding means may be synchronously driven by the drive means of the packaging apparatus.

2. Description of the Prior Art

U.S. Pat. Nos. 2,653,430, 2,746,223, and 3,344,576 are cited as being merely representative of what is otherwise a voluminous prior art. The prior art apparatus generally is complex, requires substantial space and does not meet the increasing high-productivity requirement. Pertinent to the present invention it has been proposed as seen in U.S. Pat. No. 3,344,576 to rotate plural material guides, i.e., funnels, which guide the material to the packets while being filled. It has also been proposed to rotate the packets themselves to facilitate filling. One also finds in the prior art various cam-actuated operators which set on the packets and which revolve and assist in the filling, metering or discharge functions which are inherent in any packaging apparatus. Metering is normally accomplished by stationary and relatively complex metering valves.

The application disclosure, Ser. No. 805,149 is the closest prior art. Such disclosure teaches employment of a rotating container having a plurality of cam-actuated valves mounted on the container periphery and which container holds the material to be packaged. Each valve fills with material, isolates one or more units of material and discharges material units into synchronized individual packets or containers to be filled. While a marked advance over the prior art the valve operations have required many moving parts.

While the terms "valves" or "metering units" are used throughout the disclosure, they are defined and considered to be for the purposes of the present invention as metering trap chambers in accordance with established patent terminology.

SUMMARY OF THE INVENTION

The present invention resides around the concept of maintaining a supply of fluid material to be packaged in a rotatable container, rotating the container at some uniform speed in a constant direction, and simultaneously rotating a set of "valves," i.e., metering devices which are arranged in a circular configuration and which are connected to and which rotate with the container. Each valve provides an elongated, nonlinear, material flow path between an inlet and outlet and in the embodiments disclosed such path is of helical shape. At a filling station each valve is positioned so that the material to be packaged is drawn from the container through the valve inlet and so as to locate itself at one end of the helical path. As the valve rotates around the container axis all material in excess of a unit of material is discharged through the inlet and the rotation causes the unit to move along the helical path and approaches the valve outlet. As the valve reaches a separate discharge station the unit of material reaches the end of its helical path and is discharged in synchronism with a packet or other container to be filled mating with the valve outlet. In the embodiments shown two such helical paths and two units of material are discharged.

With the aforementioned in mind the object of the instant invention is to provide a unit valve or metering construction, an apparatus and method capable of high productivity and precision volume packaging of condiment-type materials or the like with a minimum of moving parts.

Further objects and advantages will become apparent from the detailed description and claims hereinafter set forth, particularly when taken in reference to the accompanying drawings, which illustrate by way of example and not of limitation, several embodiments of the instant invention for producing packages of condimentlike materials.

DESCRIPTION OF THE DRAWINGS

In the drawings:

FIG. 3 is a top view of an assembled valve.

FIG. 4 is an end view of an assembled valve.

FIG. 5 is a side view of an assembled valve.

FIG. 6 is an opposite side view of an assembled valve.

FIG. 7 is a bottom view of an assembled valve.

FIG. 8 is a section view of an assembled valve taken on line 8—8 of FIG. 3 and with no material in the valve.

FIG. 9 is a section taken on line 9—9 of FIG. 5 to show the angle of the discharge tube.

FIG. 10 is a section taken on line 10—10 of FIG. 1 of the valve only and with the valve filled with material.

FIG. 11 is a section taken on line 11—11 of FIG. 1 of the valve only showing excess material dumped and the valve inverted.

FIG. 12 is a section taken on line 12—12 of FIG. 1 of the valve only with the valve beginning to dump and prior to refill.

FIG. 13 is an alternative embodiment similar to FIG. 7 and utilizing a spiral tube in place of a screw.

DESCRIPTION OF THE PREFERRED EMBODIMENTS

Figure 1:
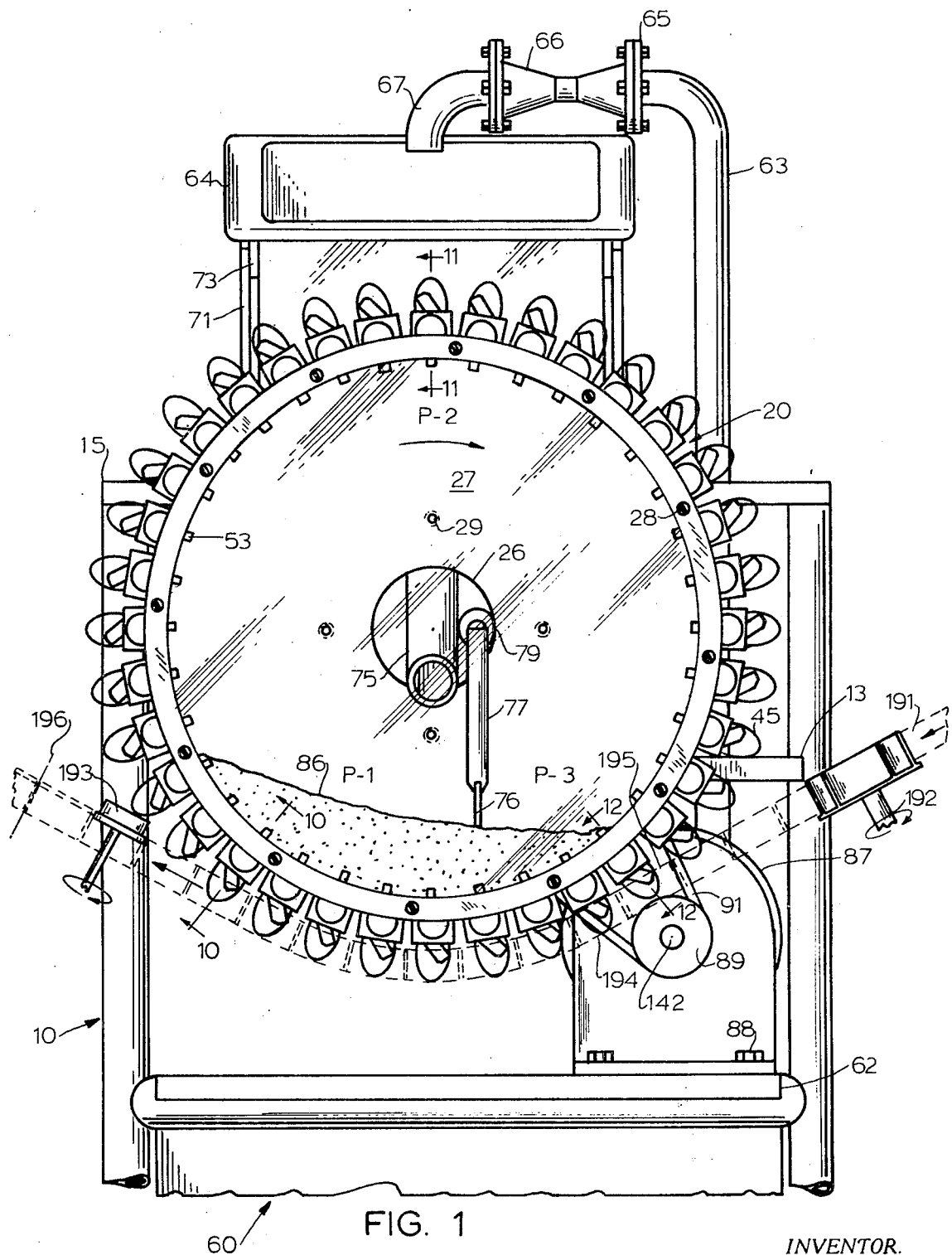
FIG. 1 is an enlarged fragmentary front view of a first embodiment of the packaging apparatus showing the rotor, the filling spouts around the rotor, the feed hopper, and the upper portion of the machine frame and in dashed lines a typical strip of packets.
Figure 2:
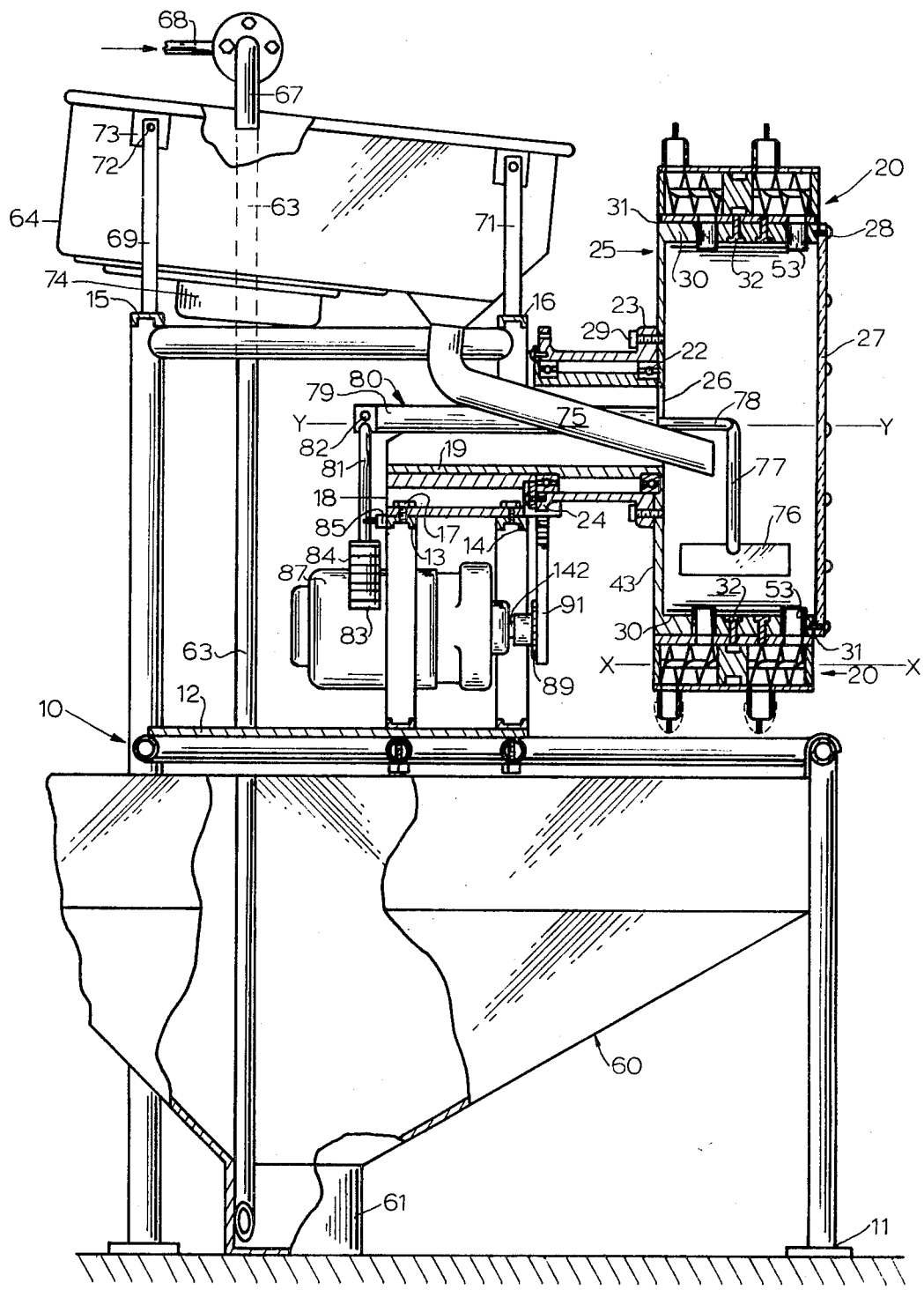
FIG. 2 is a fragmentary side elevation view of the apparatus shown in FIG. 1 with selected parts broken or sectioned for illustration.

Referring now to the drawings in detail wherein like numbers pertain to like parts reference is first made to FIGS. 1 and 2 wherein the general details of the preferred and first embodiment of this invention are shown. Various commonly used frame bracing members and the like have been eliminated to simplify the drawings.

The packager machine frame 10 consists of welded tubular construction which is provided with the floor mounting feet 11, the drive-motor-mounting plate 12, the rotor-mounting channels 13 and 14, and the rotor filling hopper support channels 15 and 16. Affixed to the rotor-mounting channels 13 and 14, by means of the screws 17, is the rotor-mounting base frame 18 which is also of welded construction. The rotor-mounting base frame 18 has affixed thereto the bearing support 19 which is formed of a tube and has a machined exterior surface for the mounting of the ball bearings 22. The bearing support 19 is stationarily mounted to the rotor-mounting base frame 18 by means of screws, not shown. The bearings 22 mount for rotation the annular bearing housing 23 which is provided with the integral timing belt drive pulley 24 on one end thereof.

In FIG. 1 there is additionally shown the general arrangement of auxiliary apparatus that may be used in conjunction with the packaging apparatus of this invention when applied to strip-type packets. While not shown, the rotor drive shaft 142 may be adapted to mount a timing belt drive pulley whereby the packet-forming rolls 192 and the filled packet-sealing rolls 193 may be synchronously driven with respect to the rotor. The packet-forming paper 191 may be advanced from a supply source, not shown, and passed over a folding blade, not shown, for passage into the nip of the heated packet-forming rolls 192 in the folded state. The packet-forming rolls provide a continuous strip of packets 194, shown in dashed lines, which are continuously fed to the packet-filling spouts along an arcuate path due to the angular relationship between the packet-forming rolls 192 and the heated packet-sealing rolls 193. The arcuate path imparted to the packets 194 results in the opening of the unsealed edge 195 sufficiently to enable the entry of the packet-filling spout 51 and which is assisted by loops 45. A conventional cutter 196, severs the continuous strip of packets into single packages. The representation of packets 194 should of course be understood to represent not only strip packets but any suitable container such as bottles, boxes and the like, and in the case of bottles, boxes and the like container feed mechanism would be modified accordingly. Also where the word "fluid" appears such terminology should be understood as referring to a fluid material either in granular, e.g., sugar, salt, or paste, e.g., mustard, catsup, or liquid, e.g., olive oil or other salad dressing and which is capable of flowing unpressurized and under the influence of gravity and centrifugal forces.

The rotor 25 is of one-piece, pan-shaped, construction and is provided with the through bore 26 in its rear wall 43 and has its front face covered by a transparent cover plate 27 which is secured by the screws 28 to provide a hollow drum or container for the material. The rotor 25 is affixed to the bearing housing 23 by means of screws 29 and is concentrically mounted with respect to its axis of rotation by means of bearings 22. The external peripheral wall 30 of the rotor 25 is provided with externally machined surfaces 31 on which are mounted the uniformly and peripherally spaced metering and dispensing valves 20 by means of screws 32.

Here it should be understood that the word "valve" is used somewhat arbitrarily since as later described the "valves" of the invention have no moving parts and do more than provide a flow path. The valves of the invention act in fact as a means for receiving, metering, guiding, and discharging units of material on each rotation of rotor 25.

The metering and dispensing valves 20 which are shown in greater detail in FIGS. 3 through 12 are adapted to package two packets simultaneously; however, more or less packets may be packaged with the appropriate modifications to the apparatus. The "packets" may be either in continuous strip form, as in FIG. 1, or in the form of discrete containers such as bottles or boxes, not shown.

Each metering and dispensing valve 20 comprises a rectangular block housing 42 whose interior is hollow and of cylindrical shape. The circular end openings or housing are closed by circular discs 33, 34 held by setscrews 40', 40''. A cylindrical spacer block 36 having a groove 37 is snugly fitted and centered in the interior of housing 42 and effectively divides housing 42 into two independent valve sections V-1 and V-2. A pair of snugly fitted screws 38, 39 are located on opposite sides of spacer block 36. Screws 38, 39 provide respective helical-shaped flow paths for the material. As previously mentioned housing 42 is secured to the rotor surface 31 by means of screws 32 fitted into threaded holes 35', 35''. Material is fed into valve section V-1 through inlet 43 and material is fed to valve section V-2 through inlet 44.

Inlets 43, 44 mate respectively with rows of inlet scoops 53, FIG. 1, which may or may not be required depending on the material being packaged. Scoops 53 are of thin wall, tubular construction and are mounted in the annular wall of the rotor 25 as by welding, brazing or the like. The valve-loading scoops 53 are flush mounted with respect to the surface 31 of the rotor 25. While not shown, the portion of each valve-loading scoop 53 which projects into the chamber of the rotor 25 may be relieved over one-half of its circumference in the direction facing the direction of rotation of the rotor as indicated by the arrow of FIG. 1. Thus, the material residing inside rotor 25 is forcibly injected into the annular passageway provided by the valve-loading scoops 53 and the aligned valve inlets 43, 44 by means of gravitational and centrifugal forces.

The valve housing 42 is further provided with the packet-filling spouts 51 which may be brazed, welded or otherwise affixed thereto. Filling spouts 51 serve as respective outlet ports for valve sections V-1 and V-2. Filling spouts 51 are thin-walled, tubular members which are flush mounted with the surface 52 of the valve housing 42 and project from the block a sufficient distance to insure entry into the packet, bottle, box or other container without the loss of any of the material being transported thereby. The filling spouts may of course be shaped to conform to the particular type of container being packaged. Additionally, the ends of the filling spouts 51 which are to project into the packets may be angularly relieved as best shown in FIG. 9 to facilitate dispensing the material into the packet, and the previously mentioned wire loops 45 serve to open the packet when filling continuous strip packets as in FIG. 1.

The description next turns to the most important aspect of the invention, namely, to the operation of screw members 38, 39 and how then act to receive the material through the respective scoops 53, measure out units of material, and then dispense the respective units of material through the filling spouts 51. In this regard it will be noted that when the valve is in the position P-1, FIG. 1, on which FIG. 10 is based, that the left ends of the screws 38, 39, as seen in FIG. 10, will fill through the respective scoops 53 and inlets 43, 44. As the valve moves on to position P-2, on which FIG. 11 is based, the valve is inverted and certain excess material is dropped back through inlets 43, 44. At the same time other material, by reason of the spirally screw effect, is trapped in the respective turns of the screw members 38, 39 and is advanced axially in the direction of the respective filling spouts 51. It is this trapped material that now constitutes a measured material unit in each respective valve sections V-1, V-2. As the valve continues to rotate around the axis of rotor 25, it will be noted that the spiralling screw action will continue to advance the trapped material axially in each respective screw member 38, 39. Once the valve reaches the position P-3 on which FIG. 12 is based, the trapped unit of material in each respective screw member 38, 39 will have been advanced to the point that the material reaches the respective outlet and is free to pour out of the respective filling spouts 51. At the same time new material begins to pour into the respective inlets 43, 44 for screw members 38, 39, as shown in FIG. 10, but the new material because of the respective screw member positions at position P-3 remains isolated from the material being dispensed. As the valve moves on again to positions P-1, P-2 and back to P-3 the cycle of course repeats. Thus, each valve section V-1, V-2 receives, measures off, stores and discharges a unit of material on each rotation.

From the foregoing, it can be seen that moving valve parts and valve actuation mechanisms have been completely eliminated. Further, it can be seen that so long as the rotor 25 rotates at some uniform speed and the rotor 25 is kept filled to the level of material as in FIG. 1 the valves will sequentially fill, dump excess material and move to the respective filling spouts 51, predetermined units of material which will always be of uniform amount. It can also be seen that the material "unit" is determined by the diameter, pitch, blade thickness, speed of rotation and nature of material which factors once determined and fixed insure a uniformity in measuring the respective units. Further, simply by changing the pitch or diameter of the screw being employed the volume in the material unit can be changed and in come cases simply by speeding up or slowing down the speed of rotation the volume in the material unit can be changed.

In one embodiment used to package sugar, screws 38, 39 were each made with 1½ turns of 9/16-inch pitch, Teflon-coated, 1 7/16-inch diameter nylon screws. The screw vane thickness was approximately one-sixteenth inch. Rotor 25 was about 36 inches in diameter and was rotated at between 10 to 20 r.p.m. and the packets 194 each received approximately 1 teaspoon or 4.5 grams of sugar.

Rotor 25 is of course always rotated in the same direction and speed of rotation while constant for a given material is preferably adjusted to the nature of the material. That is, to gain maximum advantage of both gravitational and centrifugal forces the speed should be adjusted to be sufficiently fast so that the valve tends to fill in excess of a unit of material on each rotation with the excess being eliminated by the fact that each respective valve when it inverts to position P–2 will only retain one unit of material in each respective valve section. Paste materials therefore, such as mustard and catsup will normally require a somewhat higher speed than liquid and granular materials and in some cases the materials are expected to be heated and dried.

The system for storing and transferring the material prior to introduction to the rotor is arranged to handle large volumes with minimum handling. In particular, the system comprises the storage bin 60 which is of welded construction and which has the limited volume base 61 to facilitate pickup and which rests on the floor. Storage bin 60 is affixed to the machine frame 10 by means of the curved extending lip 62 engaging a crossmember thereof.

The elevating of the material from the storage bin 60 is accommodated by the vacuum-lift tube 63 which extends vertically from the limited volume base 61 of the storage bin 60 through the drive motor mounting plate 12, to which it is welded for support, and thence upward to the elevated hopper 64. The vacuum-lift tube 63 is provided with the flange 65 for mounting the pneumatically actuated aspirator 66. The flange mounted elbow 67 affixed to the aspirator 66 directs the flow of the material into the hopper 64. A semiperforate cover plate, not shown, may be provided for those materials of low density which might be blown out of the hopper 64 by the high-velocity jetstream emanating from the aspirator 66. The aspirating medium which may be compressed air is supplied to the aspirator 66 from a source, not shown, by means of the line 68.

The elevated hopper 64 is mounted on the support channels 15 and 16 by means of the U-shaped supports 69 and 71. Hopper 64 is provided with support pins 72 and pin-mounting pads 73 which may be welded thereto and which mount hopper 64 for vibratory motion provided by the electrically powered vibrator 74 that is affixed to the underside of hopper 64. Hopper 64 is mounted sloping toward the rotor 25 and has attached thereto the rotor feed tube 75 which extends into the interior chamber of rotor 25. Various other storage and elevating arrangements may of course be used.

A rotor level control 80 is provided to regulate and control the level of material residing in the rotor 25 and indicated at 86. The rotor level control comprises the level control vane 76 affixed to the vane support arm 77 which in turn is welded to the pivot shaft 78. The pivot shaft 78 is mounted for oscillatory motion by means of the tubular support 79 which is welded to the interior of the bearing support 19. The weight support arm 81 is pinned to the pivot shaft 78 by means of the pin 82 and has the flange 83 affixed to the end thereof whereby weights 84 may be added to or removed from arm 81 in accordance with the material level required in the rotor 25.

In use pivot shaft 78 is free to rotate around its own axis inside tubular support 79. The feeding of the material into the container formed by rotor 25 is controlled by the respective degree of angular displacement of the rotor level control vane 76 with respect to the vertical and by means of the electrical limit switch 85 which is mounted for actuation by the weight support arm 81 and which is electrically wired to control the power input to the hopper vibrator 74. Rotation of vane 76 of course rotates shaft 78 and causes corresponding rotation of arm 81. The minimum level for material residing in the interior chamber of the rotor 25 is indicated by the line 86 of FIG. 1 and is generally representative of a level for sugar and the like. The maximum permitted level, while not indicated, would be at that angle of rotation of the level control vane 76 at which the weight support arm 81 engages and actuates the limit switch 85.

The packaging apparatus drive means consists of the variable speed, gear-reduction drive motor 87 which is mounted upon the drive motor mounting plate 12 by means of the screws 88. Affixed to the output shaft of the drive motor 87 is the dual-width timing belt pulley 89 with the timing belt 91 extending around the pulleys 89 and 24. The dual-width timing belt pulley 89 is provided as a means whereby auxiliary equipment such as a packet former and packet sealer may be synchronously driven with respect to the rotor 25.

The speed of rotation of rotor 25 may vary over wide limits and generally speaking the speed can approach zero revolutions as a minimum speed. The maximum speed however is more critical since at exceptionally high speed the centrifugal forces could prevent operation. This will vary with the particular shape of path and material. Those who apply the invention will very quickly determine the best speed for the particular material desired to be used with the invention.

Various other ways of achieving the helical screw transfer and measuring effect of the invention will become apparent to those skilled in the art and one alternative embodiment is shown in FIG. 13. In FIG. 13 the screw members 38, 39 are replaced by corresponding helical tube members 47, 48 which are snugly fitted and fixed in the housing 42. From the description of the first embodiment it will be seen that such helical tubes provide a helical or screwlike path and serve the same purpose and operate in the same manner as the screw members 38, 39. That is, the unit of material is measured off and moved axially of a helical path while the path axis, X—X in FIG. 2, rotates around another parallel central axis, i.e., the rotor axis Y—Y in FIG. 2. The FIG. 13 construction can also be seen to utilize the same inlet-outlet arrangement wherein the inlet and outlet are laterally displaced and on opposite sides of the helical tube axis. It can also be seen that by changing either the pitch, inner tube diameter or overall diameter of the helical tube members 47, 48 the amount of material in the "unit" is readily changed. It is also contemplated that various internal baffle arrangements may be employed to establish a suitable nonlinear, elongated path and to simulate the effect of measuring, trapping and moving a unit of material between inlet and outlet ends of the path while the structure defining such flow path is being rotated around some central axis, i.e., axis Y—Y in FIG. 2 at a preselected speed. By varying the length and shape of the path the point of discharge can be varied widely from those disclosed in the present embodiments. The outlet and inlet may constitute the same port and may be disposed in various configurations. Furthermore, it is contemplated that many applications other than packaging where a volume of fluid substance is required to be continuously divided into discrete units will find use for the invention. Spots of glue, paste or paint could, for example, be applied with the invention in high production to furniture pieces, metal parts, paper and the like.

What is claimed is:

1. The method of packaging fluid materials comprising:
   a. storing the material to be packaged in a rotatable cylindrical supply container and which mounts in a concentric circular configuration around the container for rotation therewith a plurality of evenly peripherally spaced uniform metering trap chambers, each chamber having an inlet communicating with the container for receiving material and an outlet for discharging material and having between said inlet and outlet a nonlinear elongated constantly open path adapted in a first rotative position to receive from said container and hold in excess of a unit of material, in a second rotative position to trap and discharge back to said container through said inlet all except a unit of material and between said second and a third rotative position to guide said unit towards said outlet and at said third position to discharge said unit through said outlet;

b. continuously rotating the container and chamber around a central horizontal axis to move the chamber successively past filling and discharge stations located proximate the lower half of the path of rotation;

c. at the filling station positioning each chamber successively to cause said path to assume said first position;

d. subsequent to leaving said filling station and prior to reaching said discharge station positioning each said chamber in such manner as to cause said path to assume said second position;

e. at the discharge station positioning each chamber to cause said path to assume said third position to allow discharge of said unit of material from said outlet;

f. continuously guiding and moving past the discharge station a series of fill containers, the movement of respective fill containers being synchronized to mate with a respective chamber and the presence of a respective unit of material discharge, such that the fill containers are successively guided to the discharge station and individual fill containers are filled with a unit of material from said supply container and are then moved away from said discharge station; and g. continuously measuring the level of material in the supply container and replenishing the material to maintain some predetermined level in the lower portion thereof and effecting said chamber filling and discharge steps when each respective chamber is in a position below the material in said lower portion.

2. An apparatus for dividing fluid material into uniform units, comprising:

a. a container containing a volume of fluid material to be dispensed in discrete units;

b. a plurality of uniformly spaced and circularly arranged metering trap chambers mounted for rotation as an integral structure around a central horizontal axis, each chamber providing at least one open nonlinear elongated fluid material flow path extending between an inlet and an outlet;

c. means for rotating said chambers at a uniform predetermined speed and in a constant direction around said central axis, each chamber being adapted on each rotation and at said speed to communicate its respective inlet with said container at a first rotative position to receive a portion of said fluid material into said path, to discharge through said inlet as said chamber rotates away from said first position all except a quantity equal to one unit of said material, and to guide said unit along said path towards said outlet under the influence of the rotative forces asserted thereon as said chamber rotates at said speed towards a second rotative position to a discharge station whereby said unit is discharged from said outlet simultaneous with said chamber arriving at said second position; and d. means for guiding and longitudinally moving a continuous series of separate containers to be filled past said discharge station, each said container to be filled having an open end adapted to mate with and receive the discharge of a unit of material from a selected said chamber outlet.

3. An apparatus as claimed in claim 2 wherein said container is formed by a pair of opposed sidewalls and a peripheral wall joined therewith, said filling means conveys said material to said container through one of said sidewalls, said levelling means maintains said level in the bottom positioned portion of said container and said chamber inlet passes through said peripheral wall.

4. An apparatus as claimed in claim 2 wherein said path is of a substantially helical shape the axis of which is oriented parallel to said central axis.

5. An apparatus as claimed in claim 2 wherein said container is cylindrical, said chambers are mounted on and rotate with said container around said central axis and said inlet communicates with the interior of said container.

6. An apparatus as claimed in claim 2 wherein said path is of a substantially helical shape the axis of which is oriented parallel to said central axis, said container is cylindrical and said chambers are mounted on and rotate with said container around said central axis, said inlet communicates with the interior of said container and said inlet and outlet are laterally displaced along the axis of said path.

7. An apparatus as claimed in claim 6 wherein said chamber includes a housing providing said inlet and outlet ends and a void and said path is formed by a screw member fixed within said housing void and communicating at one end with said inlet and at the opposite end with said outlet, said screw member being dimensioned to measure said unit.

8. An apparatus as claimed in claim 6 wherein said path is formed by a helical tube and said tube is dimensioned to measure said unit.

9. An apparatus as claimed in claim 2 wherein said chamber provides a plurality of said paths each having its own said inlet and outlet.

10. An apparatus as claimed in claim 6 including filling means comprising a storage receptacle containing a volume of said material, conveyor means to convey said material from said receptacle to said container and levelling means controlling said conveyor means and effective to maintain a predetermined level of material in said container.

11. An apparatus for dividing fluid material into uniform units, comprising:

a. a cylindrical container containing a volume of fluid material to be dispensed in discrete units;

b. a plurality of uniformly spaced and circularly arranged metering trap chambers mounted on said container for rotation as an integral structure around a central horizontal axis, each chamber providing at least one open nonlinear elongated helical-shaped fluid material flow path extending between an inlet and an outlet, said inlet communicating with the interior of said container and said inlet and outlet being laterally displaced along the axis of said path and the axis of said path being oriented parallel to said central axis;

c. means for rotating said chambers at a uniform predetermined speed and in a constant direction around said central axis, each chamber being adapted on each rotation and at said speed to communicate its respective inlet with said container at a first rotative position to receive a portion of said fluid material into said path, to discharge through said inlet as said chamber rotates away from said first position all except a quantity equal to one unit of said material, and to guide said unit along said path towards said outlet under the influence of the rotative forces asserted thereon as said chamber rotates at said speed towards a second rotative position to a discharge station whereby said unit is discharged from said outlet simultaneous with said chamber arriving at said second position;

d. filling means comprising a storage receptacle containing a volume of said material, conveyor means to convey said material from said receptacle to said container and levelling means controlling said conveyor means and effective to maintain a predetermined level of material in said container; and e. means for guiding and longitudinally moving a continuous series of separate containers to be filled past said discharge station, each said container to be filled having an open end adapted to mate with and receive the discharge of a unit of material from a selected said chamber outlet.

12. An apparatus as claimed in claim 11 wherein said container is formed by a pair of opposed sidewalls and a peripheral wall joined therewith, said filling means conveys said material to said container through one of said sidewalls, said levelling means maintains said level in the bottom positioned portion of said container and said chamber inlet passes through said peripheral wall.

13. A structure for metering out a uniform unit of material, comprising:
- a. means providing a mount for continuous rotation in a single direction at a uniform predetermined speed around a fixed axis;
- b. a metering trap chamber secured to said mount and having an inlet and outlet, said chamber providing a constantly open nonlinear elongated fluid material flow path communicating with said inlet and outlet, said flow path shape adapting said chamber on each rotation thereof and at said speed to receive through said inlet at a first rotative position a quantity of said material in excess of said unit, to discharge through said inlet while being rotated away from said first position all but a quantity retained in said path equal to said unit, and under the influence of the rotative forces acting on said unit at said speed to guide said unit along said path towards said outlet whereby said unit is discharged through said outlet upon said chamber arriving at a second rotative position; and
- c. means for guiding and longitudinally moving a continuous series of separate containers to be filled past said discharge station, each said container to be filled having an open end adapted to mate with and receive the discharge of a unit of material from a selected said chamber outlet.

14. A structure for metering as claimed in claim 13 wherein said fixed axis is horizontal.

15. A structure for metering as claimed in claim 14 wherein said flow path is of a helical shape having its axis oriented parallel to said fixed axis and said inlet and outlet are laterally displaced and on opposite sides of said flow path axis.

16. A structure for metering as claimed in claim 15 including supply means to feed said fluid material to said metering trap chamber at said first rotative position and to receive said material discharged from said inlet while being rotated away from said first position.

17. A structure for metering as claimed in claim 16 wherein said supply means comprises a container and said inlet communicates with said container and said means providing a mount for rotation comprises said container.

* * * * *

UNITED STATES PATENT OFFICE
CERTIFICATE OF CORRECTION

Patent No. 3,631,903              Dated January 4, 1972

Inventor(s)     Clyde J. Huggins

It is certified that error appears in the above-identified patent and that said Letters Patent are hereby corrected as shown below:

Column 7, claim 3, line 62, "claim 2" should read

-- claim 10 --.

Signed and sealed this 26th day of March 1974.

(SEAL)
Attest:

EDWARD M. FLETCHER, JR.              C. MARSHALL DANN
Attesting Officer                    Commissioner of Patents